United States Patent [19]

Willomitzer et al.

[11] Patent Number: 5,422,771
[45] Date of Patent: Jun. 6, 1995

[54] ROTARY SCANNING DEVICE

[75] Inventors: Manfred Willomitzer, Frankfurt; Ralf Matwin, Weiterstadt; Hartmut Willmann, Gross-Zimmern, all of Germany

[73] Assignee: U.S. Philips Corporation, New York, N.Y.

[21] Appl. No.: 80,892

[22] Filed: Jun. 22, 1993

[30] Foreign Application Priority Data

Jul. 21, 1992 [DE] Germany .......................... 42 23 893.5

[51] Int. Cl.⁶ .......................... G11B 5/52; G11B 21/04
[52] U.S. Cl. ..................................... 360/108
[58] Field of Search ............... 360/102, 103, 107, 108, 360/130.22, 130.23, 130.24, 84; 439/61, 65, 79; 361/694, 703, 736, 755, 784, 785, 690, 692, 694, 718–721, 784

[56] References Cited

U.S. PATENT DOCUMENTS

| | | | |
|---|---|---|---|
| 3,597,721 | 8/1971 | Mangan | 361/784 |
| 4,756,694 | 7/1988 | Billman et al. | 439/61 |
| 5,060,111 | 10/1991 | Takashima | 361/384 |
| 5,119,273 | 6/1992 | Corda | 361/413 |

FOREIGN PATENT DOCUMENTS

| | | | |
|---|---|---|---|
| 1-3809 | 1/1989 | Japan | 360/130.24 |
| 1559443 | 4/1990 | U.S.S.R. | 361/736 |

OTHER PUBLICATIONS

Hashimoto et al., "An Experimental HDTV Digital VTR With A Bit Rate of 1.188 Cbps", IEEE Transactions of Broadcasting, vol. BC-33, No. 4, Dec. 1987, pp. 203–209.

Primary Examiner—Stuart S. Levy
Assistant Examiner—William J. Klimowicz
Attorney, Agent, or Firm—Brian J. Wieghaus

[57] ABSTRACT

A rotary scanning device is proposed with a rotary body carrying at its periphery a plurality of magnetic recording heads which can be driven by associated recording amplifiers. The individual recording amplifiers are accommodated on circuit boards which are mounted in a paddle-wheel configuration between two annular conductor boards by means of holders. The two annular conductor boards are rotationally locked to the rotary body. The circuit boards have a forward inclination in the direction of rotation of the rotary body.

18 Claims, 2 Drawing Sheets

ROTARY SCANNING DEVICE

BACKGROUND OF THE INVENTION

The invention relates to a rotary scanning device including a rotary body having a plurality of magnetic recording heads secured to its periphery and having recording amplifiers, which are associated with the magnetic recording heads and can be driven via a rotary transformer.

Such a scanning device is known from the document IEEE Transactions on Broadcasting, Vol. BC-33, No. 4, Dec. 1987, pp. 203 to 209. The known scanning device comprises an 18-channel rotary transformer for 18 magnetic heads arranged at the periphery of a rotary drum. The 18 magnetic heads comprise eight magnetic heads for recording, eight magnetic heads for reproducing and two magnetic heads for erasing a digital HDTV signal. The rotary drum carries recording and playback amplifiers which should each be capable of handling a data transmission rate of 148.5 Mbit/s in order to achieve recording on and from the magnetic tape with an overall data transmission rate of 1.188 Gbit/s.

SUMMARY OF THE INVENTION

It is an object of the present invention to provide a rotary scanning device of the type mentioned in the opening paragraph, which accommodates a larger number of recording amplifiers and which can dispose of the power dissipated by the recording amplifiers.

This object is achieved by providing an annular conductor board which is coaxial with the rotary body and rotates therein. A plurality of circuit boards including the recording amplifiers, are arranged in a star configuration perpendicular to the radial plane.

The rotary scanning device in accordance with the invention has the advantage that the recording amplifiers accommodated on printed circuit boards constitute radial vanes of a paddle wheel, the paddle wheel being formed by the rotary body of the scanning device. The amplifier elements accommodated on the circuit boards are cooled by the ambient air circulating around them.

Another advantage is that since the recording amplifier boards have a construction oriented perpendicularly to the radial plane of the rotary body the scanning device can accommodate a plurality of recording amplifiers, for which no space is available in the radial plane of the rotary body owing to the finite diameter thereof.

Advantageous modifications and improvements to the rotary scanning device defined in claim 1 can be obtained by means of the steps defined in the subsidiary claims. A particularly advantageous feature is that a forward inclination of the recording amplifier boards in the direction of rotation of the rotary body promotes the air circulation in the axial direction of the rotary body, thereby enabling an overpressure built up at the location of a gap separating the upper drum and the lower drum of the scanning device to be eliminated. This step enables the head-tape contact and hence the signal-to-noise ratio of the reproduced signal to be improved.

BRIEF DESCRIPTION OF THE DRAWINGS

An embodiment of the invention will now be described in more detail, by way of example, with reference to the drawings. In the drawings.

DESCRIPTION OF THE PREFERRED EMBODIMENTS

Figure 1:
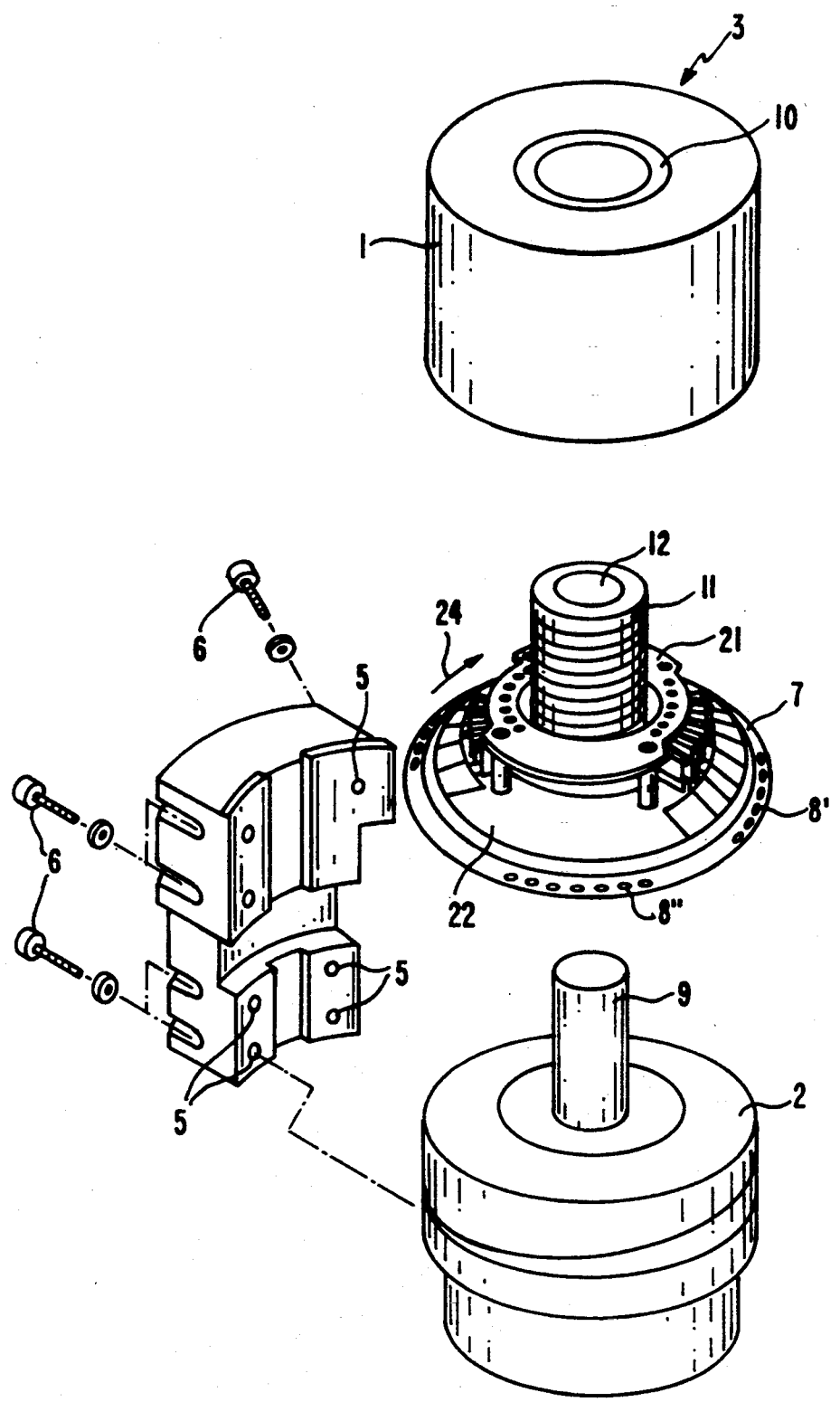
FIG. 1 is an exploded view of the rotary scanning device in accordance with the invention.

In the Figures like parts bear the same reference numerals. In FIG. 1 the numeral 1 refers to an upper drum and the numeral 2 to a lower drum of a stationary tape-guide drum. The upper drum 1 and the lower drum 2 are coaxially aligned by means a Vee-type drum guide 4. The drum guide 4 has bores 5 which are oriented perpendicularly to the axial direction of the upper drum 1 and the lower drum 2 and through which screws 6 extend to draw the two drums 1 and 2 into the Vee of the drum guide 4 and secure them at this location. A head disc 7 is arranged to rotate in a gap between the upper drum 1 and the lower drum 2 and carries clusters of magnetic heads 8' and 8" at its periphery. The head disc 7 is rotationally locked to a shaft 9 driven by a head-disc motor situated in the lower drum 2.

The recording and erase signals as well as the operating voltage are transferred via rotary transformers comprising a stator section 10 and a rotor section 11. The stator section 10 of the rotary transformers is secured in an inner bore of the upper drum 1. The rotor section 11 is force-coupled to a mandril 12 of the head disc 7. Further rotary transformers for the reproduction signals produced by the magnetic reproducing heads by scanning of a magnetic tape (not shown) are arranged underneath the head disc 7, spatially separated from the recording transformers 10 and 11.

Eighteen wide-band recording amplifiers are arranged above the head disc 7. Sixteen of these recording amplifiers provide 16-channel digital recording of a HDTV signal and in the case of an inductive load of 300 nH by a magnetic recording head 8' each supplying a recording current of 160 nA at a rise time of 2.6 ns. Two other of these recording amplifiers serve to drive two erase heads each having a head inductance of approximately 1.2 $\mu$H.

Figure 3A:
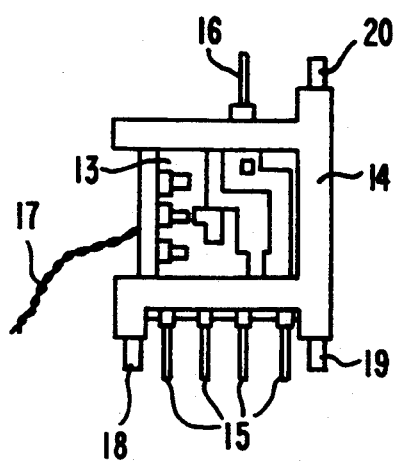
FIG. 3 shows the front and rear of a U-profile holder for a recording amplifier board.
Figure 3B:
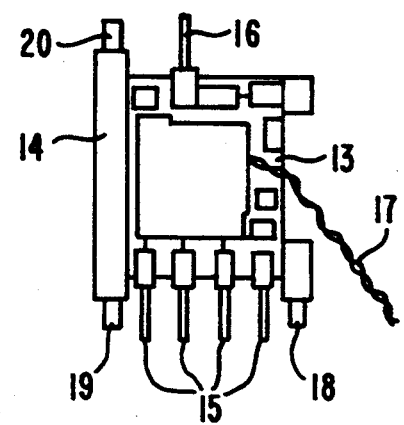

Each recording amplifier is accommodated on a rectangular circuit board 13 of a ceramic material. FIG. 3a shows the rear and FIG. 3b shows the front of such a circuit board 13 mounted in a double L-shaped holder 14. At its lower edge each circuit board 13 has four terminals 15 for the supply of an operating voltage, for the signal supply and for turning on/off a recording amplifier. A further operating voltage signal is applied to a terminal 16 at the upper edge of the circuit board 13. A recording current supplied by the recording amplifier is applied directly to the head coil of an associated magnetic recording head 8' via a twisted lead 17. Each double-L shaped holder 14 has two pins 18 and 19 at its upper side and one pin 20 at its lower side.

Figure 2:
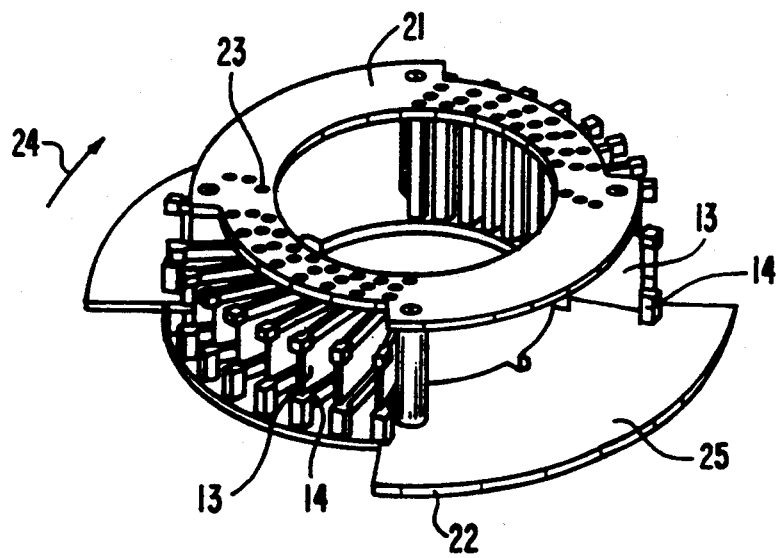
FIG. 2 shows a paddle-wheel type holder device for the recording amplifier arrangement.

The eighteen recording amplifier modules shown in FIG. 3 are mounted between two spaced-apart rings 21 and 22 as shown in FIG. 2. The two rings 21 and 22 have conductor tracks. The two rings 21 and 22 also have a plurality of bores 23 for the terminals 15 and 16 and for the pins 18, 19 and 20. In the present embodiment the eighteen recording amplifier modules are arranged in segment groups of nine amplifiers each, the resulting segment groups being situated diagonally opposite one another.

The device shown in FIG. 2 resembles a "paddle wheel", whose radial vanes are formed by the recording amplifier modules. This "paddle wheel" is arranged on the upper side of the head disc 7 and is secured thereto in a concentrically aligned position. When the "paddle wheel" is rotated in the direction indicated by an arrow 24 air will circulate around the recording amplifier modules, so that the heat produced by the power dissipation of the recording amplifiers can be carried off to the ambient air.

In an advantageous implementation of the "paddle wheel" the circuit boards 13 mounted in the holders 14 have a forward inclination in the direction of rotation 24. As a result of this step a part of the air circulation is not directed towards the exterior, i.e. towards the magnetic heads 8' and 8" mounted at the periphery of the head disc 7, but is deflected towards the head disc axis. At the location of the path of the magnetic heads 8' and 8" this substantially prevents the magnetic tape wrapped around the tape guide drum 3 from being pushed away to an impermissible extent from the head faces of the magnetic heads 8' and 8" as a result of an overpressure and thus disturbs the head-tape contact. An overpressure building up in the axial direction can be eliminated through bores (not shown) in the upper drum 1.

As already stated, the recording and erase signals are transferred by means of rotary transformers arranged above the head disc 7. Ends of the rotor winding 11 are connected to the ring 22, which transfers the applied recording signals to the terminals 15 of the recording amplifier modules via conductor tracks. The alternating voltage which is also applied via rotary transformers is rectified at the location of the segments 25 of the ring 22 in order to provide the operating voltage required for the operation of the recording amplifier modules.

We claim:

1. A rotary scanning device, comprising:
   a rotary body having an axis of rotation and a periphery;
   a plurality of magnetic heads secured at the periphery and disposed in a radial plane;
   an annular conductor board coaxial with and rotatable with the rotary body; and
   a plurality of circuit boards comprising amplifiers for the magnetic heads, the circuit boards being secured to the conductor board and extending radially and perpendicularly to the radial plane, said radial and perpendicular extension of said circuit boards causing air to flow over and thereby cool said circuit boards during rotation of said rotary body.

2. A rotary scanning device as claimed in claim 1 comprising two of said annular conductor boards, said conductor boards being axially spaced and including bores, and a plurality of double L-shaped holders holding the circuit boards, which holders have pins at their edges engaging in respective bores in said two spaced annular conductor boards.

3. A rotary device as claimed in claim 2, characterized in that the conductor boards have conductor tracks with bores therein, and the edges of the circuit boards have terminals which engage in the bores in the conductor tracks in an electrically conducting manner.

4. A rotary scanning device as claimed in claim 2, characterized in that the holders of the circuit boards mounted between the two annular conductor boards have a forward inclination in the direction of rotation of the rotary body.

5. A rotary scanning device as claimed in claim 2, characterized in that the holders of the circuit boards mounted between the two annular conductor boards are arranged in segments.

6. A rotary scanning device as claimed in claim 3, further comprising a rotary transformer with rotor windings, the windings having terminals that are connected to the conductor tracks of the spaced-apart annular conductor boards, terminals on the circuit boards electrically connected to the conductor tracks, head coils in each of the associated magnetic recording heads, and twisted leads connecting each of the head coils with a respective one of the amplifiers.

7. A rotary scanning device as claimed in claim 4, characterized in that an angle of inclination of the circuit boards, which are inclined in the direction of rotation of the rotary body, has been selected so as not to raise the air pressure in an area of the path of the magnetic recording heads.

8. A rotary scanning device as claimed in claim 2, further comprising a rotary transformer with rotor windings, the windings having terminals that are connected to the conductor tracks of the spaced-apart annular conductor boards terminals on the circuit boards electrically connected to the tracks head coils in each of the associated magnetic recording heads, and twisted leads connecting each of the head coils with a respective one of the amplifiers.

9. A rotary scanning device as claimed in claim 1, characterized in that the conductor board has conductor tracks with bores therein, and the edges of the circuit boards have terminals which engage in the bores in the conductor tracks in an electrically conducting manner.

10. A rotary scanning device as claimed in claim 9, further comprising a rotary transformer with rotor windings, the windings having terminals that are connected to the conductor tracks of the spaced-apart annular conductor boards, terminals on the circuit boards electrically connected to the conductor tracks head coils in each of the associated magnetic recording heads, and twisted leads connecting each of the head coils with a respective one of the amplifiers.

11. A rotary scanning device as claimed in claim 1, further comprising holders for holding the circuit boards, said holders being mounted on said annular conductor board with a forward inclination in the direction of rotation of the rotary body.

12. A rotary scanning device as claimed in claim 11, characterized in that an angle of inclination of the circuit boards, which are inclined in the direction of rotation of the rotary body, has been selected so as not to raise the air pressure in an area of the path of the magnetic recording heads.

13. A rotary scanning device as claimed in claim 1, further comprising holders for holding the circuit boards, said holders being mounted on the annular conductor board in segments.

14. A rotary scanning device as claimed in claim 1, further comprising a rotary transformer with rotor windings, wherein the conductor board has conductor tracks the windings having terminals that are connected to the conductor tracks of the annular conductor board, terminals on the circuit boards electrically connected to the tracks, head coils in each of the associated magnetic recording heads, and twisted leads connecting each of the head coils with a respective one of the amplifiers.

15. A rotary scanning device, comprising:
   a rotary body having an axis of rotation and a periphery, said rotary body having a direction of rotation about the axis of rotation;
   a plurality of magnetic heads secured at the periphery of said rotary body and disposed in a radial plane; and
   a plurality of circuit boards secured to the rotary body and comprising amplifiers for the magnetic heads, said circuit boards extending radially and perpendicularly to the radial plane and being inclined so that, during rotation of said rotary body in the direction of rotation, the air pressure in the region of said magnetic heads is not increased and a portion of the air moved by said circuit boards is directed in the axial direction.

16. A rotary scanning device, comprising:
   a rotary body having an axis of rotation and a periphery;
   a plurality of magnetic heads secured at the periphery of said rotary body and disposed in a radial plane;
   first and second axially spaced annular conductor boards coaxial with and rotatable with the rotary body, said conductor boards comprising conductive tracks;
   a plurality of circuit boards each comprising an amplifier for a respective magnetic head, said circuit boards being fixed between said conductor boards and extending radially and perpendicularly to the radial plane;
   first means for electrically connecting said circuit boards to said conductive tracks on said conductor boards; and
   second means for electrically connecting said circuit boards to said magnetic heads, said radial and perpendicular extension of said circuit boards causing air to flow over and thereby cool said circuit boards during rotation of said rotary body.

17. A rotary scanning device according to claim 16, wherein said first means includes bores in the conductive tracks and terminals on the circuit boards received in said bores and electrically connected to said conductive tracks.

18. A rotary scanning device according to claim 16, wherein said second means includes a twisted lead extending from each of said circuit boards and connected to a respective said magnetic head.

* * * * *